United States Patent [19]

Schmitt et al.

[11] 4,162,923
[45] Jul. 31, 1979

[54] CALCIUM ALUMINATE BASED REFRACTORY HYDRAULIC BINDER AND ITS PROCESS OF PREPARATION

[75] Inventors: Jean M. Schmitt, Paris; Alain Mathieu, Montelimar, both of France

[73] Assignee: Lafarge Fondu International, Paris, France

[21] Appl. No.: 876,553

[22] Filed: Feb. 9, 1978

[30] Foreign Application Priority Data

Dec. 12, 1977 [FR] France .................................. 77 37308

[51] Int. Cl.$^2$ .............................................. C04B 7/32
[52] U.S. Cl. .................................................. 106/104
[58] Field of Search .......................................... 106/104

[56] References Cited

U.S. PATENT DOCUMENTS

| | | | |
|---|---|---|---|
| 3,507,332 | 4/1970 | Venable et al. | 106/104 |
| 3,617,319 | 11/1971 | Sadran et al. | 106/104 |
| 3,963,508 | 6/1976 | Masaryk | 106/104 |

*Primary Examiner*—James Poer
*Attorney, Agent, or Firm*—Burgess, Ryan and Wayne

[57] ABSTRACT

A process of preparing a refractory hydraulic binder containing calcium aluminates, wherein
  45 to 65% clinker containing 45 to 72% CA phase, the balance being almost exclusively constituted by $CA_2$ phase, and
  55 to 35% alumina
are mixed in the presence of additives, all of the above-mentioned ingredients being ground.

13 Claims, No Drawings

CALCIUM ALUMINATE BASED REFRACTORY HYDRAULIC BINDER AND ITS PROCESS OF PREPARATION

The present invention relates to a calcium aluminate-based hydraulic binder, and more particularly to a refractory hydraulic binder having a high alumina content. The invention also relates to a method of preparing such a binder.

One of the objectives of the present invention is to provide highly refractory cements of a very high purity, adapted to be used in applications where their property is required, said cements having excellent mechanical properties in the cold state and after firing or heating over an extended temperature range.

The invention concerns a method of preparing a refractory hydraulic binder, which consists in mixing and then grinding:
- 45 to 65% clinker containing 45 to 72% CA phase, the remainder of of said clinker being constitued almost entirely of the $CA_2$ phase,
- with 55 to 35% alumina,
- in the presence of additives constituted by sodium citrate and pentasodium-tripolyphosphate in respective proportions of 0.01 to 0.3% by weight of the clinker-alumina mixture.

Said additives are provided in order to improve the conditions of practical application of the binder.

Advantageously the CA phase content of the clinker is comprised between 60 and 70% or 64 to 66%, said CA phase content being preferably 65%.

It should be noted that the term "CA phase" designates the mineralogical CaO, $Al_2O_3$, while the term "$CA_2$ phase" designates the mineralogical CaO, $2Al_2O_3$.

The alumina used when carrying out the method according to the invention has a specific surface (BET) of 2 to $15m^2/g$ and is composed of particles at least 30% by weight of which have a size of less than 2 microns. Preferably the specific surface (BET) is comprised between 4 and $10m^2/g$, the optimum value being $7m^2/g$, and about 55% of the particles have a particle size of less than 2 microns.

Preferably, the additive content is 0.1% sodium citrate and 0.15% pentasodium-tripolyphosphate, these percentages being expressed in relation to the clinker-alumina mixture.

When carrying out the instant method, it is possible to grind separately the clinker and the alumina prior to mixing them with each other, or on the contrary, to grind the clinker and the alumina together after mixing them in the above proportions. The additives may be incorporated prior to the grinding of the mixture of clinker and alumina, during the grinding thereof, or after the said grinding.

In the first one of the above mentioned cases, it is also possible to grind the alumina by a liquid phase grinding operation, it being well understood that the thus ground alumina has to be dried prior to being mixed with the clinker, the latter being necessarily ground in the dry state.

The binder obtained by the method according to the invention contains at least 98% by weight of a $Al_2O_3$ and CaO, the $Al_2O_3$ content being comprised between 78 and 87%, said binder further containing impurities in the proportion of not more than 2%, said impurities being constituted by at least one of the compounds of the group formed by $SiO_2$, $Fe_2O_3$, $TiO_2$, MgO, $K_2O$, $Na_2O$, $SO_3$, $Mn_2O_3$, $Cr_2O_3$ and volatile substances.

The alumina content is preferably comprised between 80 and 81%.

Said binder has a density of about $3.2g/cm^2$ and a fineness corresponding to an average specific surface of $9000cm^2/g$. (Blaine)

From the hydraulic binder, obtained by the method according to the invention, it is possible to prepare high-density or insulating refractory concretes by adding to said binder various granular materials, such as aluminous, silico-aluminous or magnesium-containing aggregates or the like.

Advantageously, at least one of the materials listed herein-below is used when preparing a refractory high-density or insulating concrete: fire-clays having diverse alumina contents, sillimanite, gibbsite, brown corundum, white corundum, tabular alumina, globular corundum, magnesia, magnesia spinel, zircon, chromite or the like.

In spite of the small amount of water needed when mixing the hydraulic binder made according to the invention, this binder exhibits rheological properties which are characterized by the fact that they confer an excellent workability on the binder, and refractory concretes made therefrom, whereby the latter can easily be placed by casting. These rheological properties result from the addition of the above-mentioned additives; indeed the sodium citrate, when used alone, acts as a setting time regulating agent, and the pentasodium-tripolyphosphate, when used alone, acts as a deflocculating agent on the alumina whereas the combination of these two substances has the remarkable effects illustrated by Examples 2 and 3 herein-below.

EXAMPLE 1

A hydraulic refractory binder is prepared according to the invention by mixing the following ingredients:
- 64% calcium aluminate clinker containing 65% CA phase, the balance being mainly constituted by $CA_2$;
- 36% alumina having a specific surface of 7.4 m2/g and granulometric properties such that 60% of the particles have a dimension of less than 2 microns;
- 0.1% sodium citrate and 0.15% pentasodium-tripolyphosphate, these latter proportions being expressed by weight percentages related to the total weight of the mixture of clinker and alumina.

These ingredients are ground and a hydraulic refractory binder having the following chemical composition is obtained:

| | | | |
|---|---|---|---|
| $Al_2O_3$ | 80.5 | $K_2O$ | 0.03 |
| CaO | 18.0 | $Na_2O$ | 0.25 |
| $SiO_2$ | 0.2 | $SO_3$ | 0.1 |
| $Fe_2O_3$ | 0.15 | $Mn_2O_3$ | 0.01 |
| $TiO_2$ | 0.03 | $Cr_2O_3$ | 0.01 |
| MgO | 0.1 | Volatile substances | 0.6 |

This high alumina content binder is remarkable particularly for its mineralogical constitution, comprising a mixture of CA (C=CaO; A=$A_220_3$), $CA_2$ ($CA_2$=CaO, $2Al_2O_3$) and alpha alumina. It is characterized by:
- a pyroscopic cone equivalent of about 1750° C. of the pure paste;
- a density of about $3.2g/cm^3$, and
- a specific surface (Blaine) of $8730cm^2/g$.

TABLE 1

| | | Concretes containing 42 to 44% $Al_2O_3$ Fireclay | | | | | |
|---|---|---|---|---|---|---|---|
| | | 24 h | | 110° C. | | 1100° C. | |
| Additives | W/C | RF | RC | RF | RC | RF | RC |
| without | 0.46 | 65 | 310 | 90 | 495 | 42 | 290 |
| 0.1% S.C. | 0.42 | 65 | 420 | 106 | 655 | 59 | 400 |
| 0.15% T.P.P.S. | 0.46 | 54 | 295 | 71 | 480 | 34 | 265 |
| 0.1% SC + 0.15% T.P.P.S. | 0.37 | 76 | 535 | 114 | 800 | 80 | 595 |

TABLE 2

| | | Tabular alumina concretes | | | | | |
|---|---|---|---|---|---|---|---|
| | | 24 h | | 110° C. | | 1100° C. | |
| Additives | W/C | RF | RC | RF | RC | RF | RC |
| without | 0.45 | 75 | 355 | 115 | 650 | 47 | 385 |
| 0.1% S.C. | 0.42 | 75 | 480 | 136 | 720 | 77 | 515 |
| 0.15% T.P.P.S. | 0.45 | 60 | 380 | 99 | 600 | 35 | 375 |
| 0.1% SC + 0.15% T.P.P.S. | 0.36 | 90 | 665 | 149 | 1000 | 93 | 710 |

In Tables 1 and 2 the following abrreviations are used:
S.C. = sodium citrate
RF = flexural strength
T.P.P.S. = pentasodium tripolyphosphate
RC = compressive strength
The strength value are given in bars.

EXAMPLES 2 AND 3

These examples show the interaction of the two additives used, with respect to the strengths measured on the refractory concretes containing 42 to 44% $Al_2O_3$ fireclay (table 1) and Tubular alumina (Table 2).

The mixture of 64% calcium aluminate clinker containing 65% CA with 36% alumina is prepared, and then the amounts of additives indicated in appended Tables 1 and 2 are added.

The binders so produced are then used at a binder content of 500kg/m$^3$ of concrete with fireclay and, separately, with tubular alumina refractory aggregates.

The ratio by weight of water to binder (abbreviated to W/C in Tables 1 and 2) is chosen for each mixture to give a constant concrete fluidity suitable for placing by casting.

Each of the fresh concrete mixes is then cast to form prismatic specimens which are treated as follows:
cured for 24 hours in moist air at approximately 20° C.,
cured for 24 hours as above and then dried for 24 hours at 110° C.,
cured and dried as above and then fired at 1100° C. and cooled at approximately 20° C.

After each treatment the specimens are broken to provide a measurement of their flexural and compressive strengths.

Tables 1 and 2 give the measured strengths for each of the binders, each of the refractory aggregates and each of the treatments described.

It should be noted that the invention is not limited to the examples herein above, which are given only by way of illustration; numerous modifications and variants may be envisaged by any person skilled in the art without departing from the spirit of the invention, and within its scope as defined by the appended claims.

What is claimed is:

1. A process of preparing a ground refractory hydraulic binder containing calcium aluminates which comprises:
   mixing from 45 to 65% clinker particles containing 45 to 72% CA phase, the balance being almost exclusively constituted by $CA_2$ phase, 55 to 35% alumina particles, 0.01 to 0.3% sodium citrate and 0.01 to 0.3% of pentasodium tripolyphosphate, the percentages being by weight of the entire mixture wherein the clinker, the alumina or both are ground before or after mixing.

2. The process of claim 1, wherein said clinker contains 64 to 66% CA phase.

3. The process of claim 2, wherein said clinker contains about 65% CA phase.

4. The process of claim 1, wherein said alumina has a specific surface (BET) of 2 to 15 m$^2$/g and granulomeric properties such that at least 30% by weight of the particles have a dimension of less than 2 microns.

5. The process of claim 1, wherein at least 55% by weight of the particles of said alumina have a dimension of less than 2 microns.

6. The process of claim 1, wherein the proportion of sodium citrate is about 0.1% of the total weight of the mixture of clinker and alumina, and wherein the proportion of pentasodium polyphoshate is about 0.15% of the total weight of the mixture of clinker and alumina.

7. The process of claim 1, wherein said clinker and said alumina are ground separately prior to mixing, while said sodium citrate and said pentasodium polyphosphate are added during the mixing operation.

8. The process of claim 1, wherein said clinker and said alumina are first mixed together and then ground, while said additives are optionally added prior to, during or after said mixing operation.

9. A hydraulic binder obtained by the process of claim 1.

10. The hydraulic binder of claim 9, containing at least 98% by weight $Al_2O_3$ and CaO, the $Al_2O_3$ content being between 78 and 83%, said binder further containing not more than 2% impurities of at least one of the substances selected from the group consisting of $SiO_2$, $Fe_2O_3$, $TiO_2$, MgO, $K_2O$, $Na_2O$, $SO_3$, $Mn_2O_3$, $Cr_2O_3$ and substances which appear as a loss on ignition.

11. The binder of claim 9, having a $Al_2O_3$ content between 80 and 81%.

12. The binder of claim 9, having a fineness which corresponds to an average specific surface (Blaine) of 9,000 cm$^2$/g.

13. The process of claim 1 wherein said clinker contains between 60 and 70% CA phase.

* * * * *

UNITED STATES PATENT AND TRADEMARK OFFICE
CERTIFICATE OF CORRECTION

PATENT NO. : 4162923
DATED : July 31, 1979
INVENTOR(S) : Jean Marcel Schmitt et al It is certified that error appears in the above—identified patent and that said Letters Patent is hereby corrected as shown below:

Column 2, line 63: "$A_2 2O_3$" should be --$Al_2O_3$--.

Column 4, lines 24 & 25: "granulometric properties such that" should be cancelled.

*Signed and Sealed this*

*Twenty-ninth* Day of *January 1980*

[SEAL]

Attest:

Attesting Officer

SIDNEY A. DIAMOND

*Commissioner of Patents and Trademarks*